United States Patent [19]

Hirano et al.

[11] 4,352,161

[45] Sep. 28, 1982

[54] ELECTRONIC CALCULATOR CAPABLE OF DEALING WITH VARIABLES

[75] Inventors: Reiji Hirano, Yokohama; Shinichi Nakata, Kawasaki, both of Japan

[73] Assignee: Canon Kabushiki Kaisha, Tokyo, Japan

[21] Appl. No.: 233,883

[22] Filed: Feb. 12, 1981

Related U.S. Application Data

[63] Continuation of Ser. No. 34,207, Apr. 27, 1979, abandoned, which is a continuation of Ser. No. 841,293, Oct. 12, 1977, abandoned.

[30] Foreign Application Priority Data

Oct. 25, 1976 [JP] Japan .............................. 51-128057

[51] Int. Cl.³ .............................................. G06F 15/06
[52] U.S. Cl. .................................... 364/706; 364/900
[58] Field of Search ........................ 364/706, 200, 900

[56] References Cited

U.S. PATENT DOCUMENTS 3,760,171  9/1973  Wang et al. ........................ 364/706
3,839,630  10/1974  Olander, Jr. et al. ............... 364/706
4,009,379  2/1977  Musch ................................ 364/706

Primary Examiner—David H. Malzahn
Attorney, Agent, or Firm—Fitzpatrick, Cella, Harper & Scinto

[57] ABSTRACT

An electronic calculator capable of displaying not only a value of a variable but also an answer to this value calculated in accordance with a program stored in the calculator. When the value of the variable is changed, an increment or decrement in it may be also displayed.

5 Claims, 10 Drawing Figures

FIG. 4

|   | 1 | 2 | 4 | 8 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| . | 0 | 1 | 0 | 1 |
| + | 1 | 1 | 0 | 1 |
| − | 0 | 0 | 1 | 1 |
| × | 1 | 0 | 1 | 1 |
| ÷ | 0 | 1 | 1 | 1 |
| x | 1 | 1 | 1 | 1 |

FIG. 5A

| 1. | 1 | 1 | 1 | 1 | 1 | 1 |
|---|---|---|---|---|---|---|
|   |   |   |   |   |   |   |

FIG. 5B

| 1. | 1 | 1 | 1 | 1 | 1 | 1 |
|---|---|---|---|---|---|---|
| 5. | 7 | 2 | 2 | 2 | 2 | 2 |

FIG. 5C

| 0. | 0 | 0 | 0 | 0 | 1 | 1 |
|---|---|---|---|---|---|---|
| 5. | 7 | 2 | 2 | 2 | 2 | 2 |

FIG. 5D

| 1. | 1 | 1 | 1 | 1 | 2 | 2 |
|---|---|---|---|---|---|---|
|   |   |   |   |   |   |   |

FIG. 5E

| 1. | 1 | 1 | 1 | 1 | 2 | 2 |
|---|---|---|---|---|---|---|
| 5. | 7 | 2 | 2 | 2 | 2 | 2 |

FIG. 5F

| 1. | 1 | 1 | 1 | 1 | 2 | 2 |
|---|---|---|---|---|---|---|
| 5. | 7 | 2 | 2 | 2 | 4 | 4 |

ELECTRONIC CALCULATOR CAPABLE OF DEALING WITH VARIABLES

This is a continuation, of application Ser. No. 34,207, filed Apr. 27, 1979, now abandoned, which is a continuation of application Ser. No. 841,293 filed Oct. 12, 1977, now abandoned.

BACKGROUND OF THE INVENTION

1. Field of the Invention

The present invention relates generally to an electronic calculator and more particularly to an electronic calculator wherein there are simultaneously displayed not only a value of a variable, but also an answer to a problem with respect to this variable value calculated in accordance with a program stored in the calculator and when the value of the variable is changed, an increment or decrement in it may be also displayed.

2. Description of the Prior Art

With conventional electronic calculators, such as scientific or programmable ones, a value of a variable which is keyed in to be operated as an operand in accordance with a program stored in the calculator may be displayed on their display unit. However, when an "equal" key or "program execution" key is depressed, the value of the variable disappears from the display and an answer or result is visualized instead. Therefore it is difficult to compare the variable value with the result so that it is inconvenient to change the variable value for a better result.

SUMMARY OF THE INVENTION

One of the objects of the present invention is to provide an electronic calculator capable of displaying both a value of a variable keyed in and an answer and furthermore an increment or decrement in the variable number when it is changed.

Another object of the present invention is to provide an electronic calculator which is very convenient for the conversion between the yard-pound and metric systems and between foreign currencies.

A further object of the present invention is to provide an electronic calculator capable of displaying an increment or decrement when a variable number is changed. This is very convenient when the variable number is composed of many digits, for instance 7 or 8 digits, and when an increment or decrement of the variable number occurs at only the least significant and second least significant positions.

The above and other objects, features and advantages of the present invention will become more apparent from the following description of one preferred embodiment thereof taken in conjunction with the accompanying drawings.

BRIEF DESCRIPTION OF THE DRAWINGS

FIGS. 4 and 5A–5F are views useful for explanation of the mode of operation of the electronic calculator.

DESCRIPTION OF THE PREFERRED EMBODIMENTS

Figure 1:
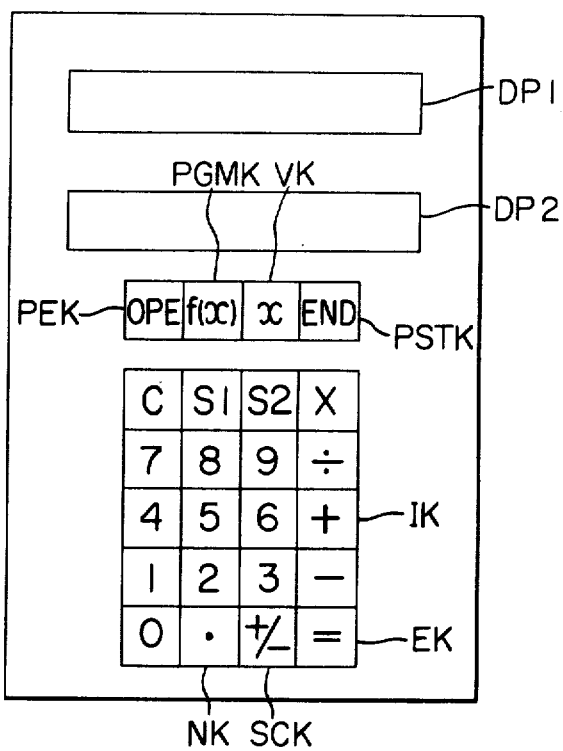
FIG. 1 is a top view of an electronic calculator in accordance with the present invention.

Referring first to FIG. 1, an electronic calculator in accordance with the present invention is provided with numeric or digit keys NK for entering numbers from 0 to 9 and a decimal point to the calculator; a sign changing key SCK for switching a positive sign to a negative sign and vice versa; function or operation keys IK for presetting four fundamental arithmetic operations; an "equal" key EK for performing an operation preset by one of the operation keys IK; a program start key PGMK for entering a program; a variable key VK for entering a variable as an operand included in a program; a program finish key PSTK for entering the instruction that the entry of the program is completed or for specifying the end of the program; a program execution key PEK for directing the execution of the program; a clear or resetting key C for resetting the calculator to its initial state; memory register specifications keys S1 and S2 for specifying memory registers; and display panels DP1 and DP2.

Figure 2:
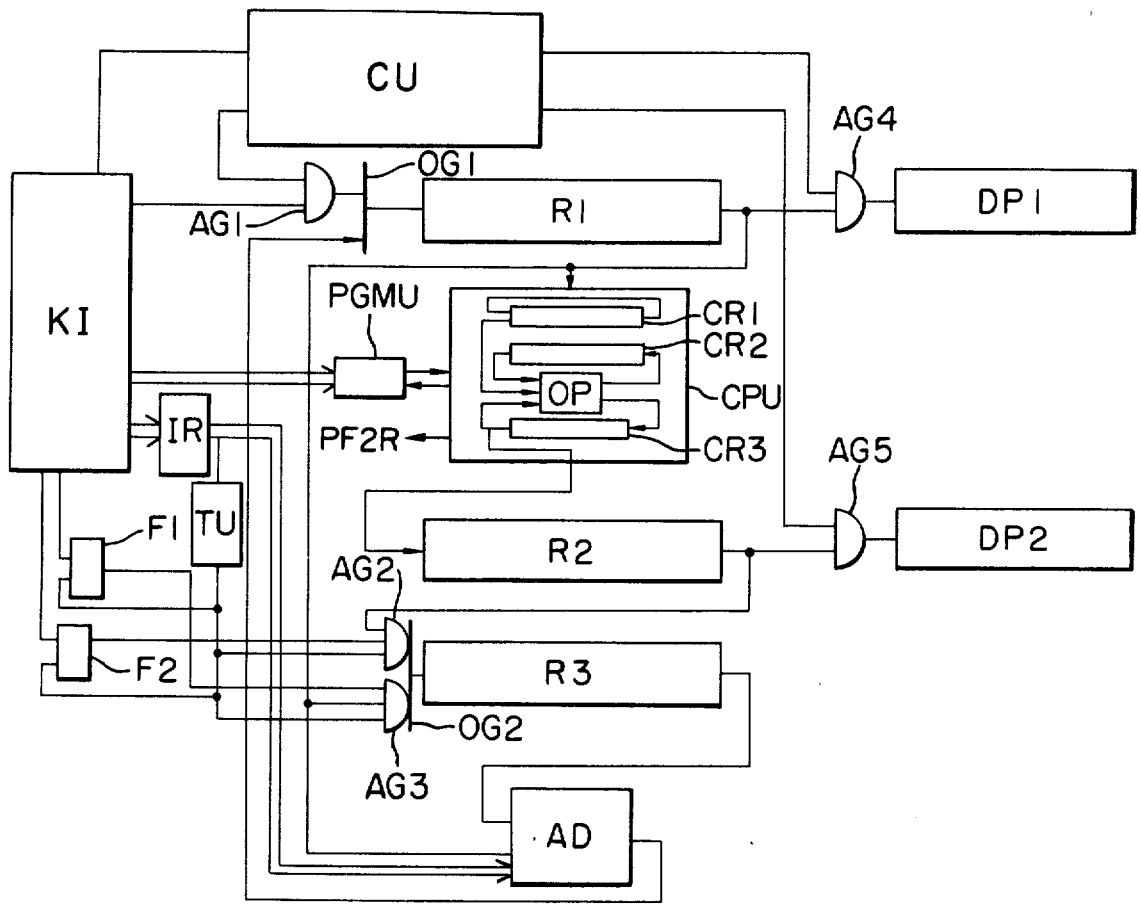
FIG. 2 is a schematic block diagram of the calculator shown in FIG. 1.

Referring to FIG. 2, an input circuit KI generates a key signal associated with a key operation. In response to this key signal a control unit CU generates a corresponding control signal. A register R1 stores numeric data derived from the input circuit KI and a second register R2 stores data processed by a central processing unit CPU. A third register R3 stores data transferred from the first register R1 or second register R2. The central processing unit CPU performs the operations on the value of the variable stored in the first register R1 in accordance with the programmed sequences stored in a program unit PGMU.

Figure 3:
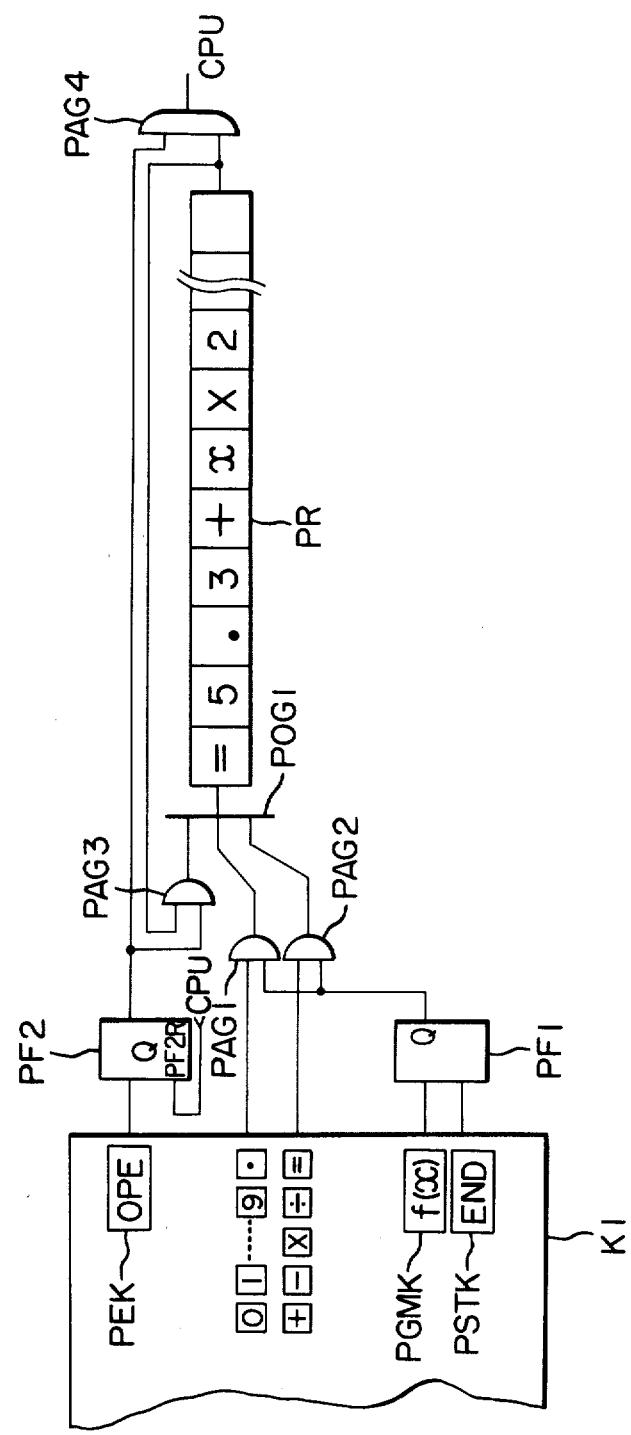
FIG. 3 shows schematically the program memory and its associated components involved in the calculator.

The program unit PGMU is shown in detail in FIG. 3. It includes a first flip-flop PF1 which is responsive to the depression of the key PGMK to produce the binary "1" at a terminal Q thereof and which is responsive to the depression of the key PSTK to be reset. When the Q-output of the first flip-flop PF1 becomes "1" to enable one port of AND gates PAG1 and PAG2, the numbers and operations entered in response to the depressions of the digit keys NK and operation keys IK are transmitted through AND gates PAG1 and PAG2, respectively, and an OR gate POG1 to be stored into a program register PR. When the key PSTK is depressed, the Q-output of the first flip-flop PF1 becomes "0" so that AND gates PAG1 and PAG2 are disabled and consequently no numeric data or operation instruction will be entered into the program register PR.

When the key PEK is depresed, a second flip-flop PF2 produces the binary "1" output at the terminal Q so that AND gates PAG3 and PAG4 are enabled and consequently the contents of the program register PR will be transferred to the central processing unit CPU. The completion of the operations in the central processing unit CPU resets the flip-flop PF2.

Referring back to FIG. 2, an adder-subtractor AD performs the operation on the contents of the first and third registers R1 and R3 to transfer the result through OR gate OG1 to the first register R1. First and second flip-flops F1 and F2 are set when the keys S1 and S2 are depressed. A register IR stores the instruction entered in response to the depression of the operation key IK or the equal key EK. In response to a change in one of a plurality of bits of a code representing an instruction entered from the operation keys IK or equal key EK, a timing signal generator TU is triggered to generate the binary "1" signal which lasts for a predetermined time. In response to the negative-going edge of this signal the first and second flip-flops F1 and F2 are reset. This signal is also used for permitting the third register R3 to store data. The entry of data into the first and third registers R1 and R3 is controlled by AND gates AG1, AG2 and AG3, and the input of data to the display devices DP1 and DP2 is controlled by AND gates AG4 and AG5. AND gate AG1 is coupled through an OR gate OG1 to the first register R1 while AND gates AG2 and AG3 through an OR gate OG2 to the third register R3.

Next the mode of operation will be described. First the mode of storing the numeric data and instructions entered in response to the depressions of the digit keys NK and operation keys IK into the program unit PGMU will be described in conjunction with the following problem or equation:

$$f(x) = 2x + 3.5 \qquad (1)$$

In response to the depression of the key PGMK, the input circuit KI generates the associated signal, in response to which the first flip-flop PF1 is set so that AND gates PAG1 and PAG2 are enabled (FIG. 3). Consequently the numeric data and instruction entered from the digit keys NK and operation keys IK are stored in the register PR. That is, when the digit key "2" is depressed, the corresponding coded signal is generated and transferred through AND gate PAG1 and OR gate POG1 into the program register PR. In a like manner, upon depression of the keys "X", "x", "+", "3", ".", "" and "=" in the order named, the corresponding code signals are sequentially stored into the program register PR while the contents thereof are shifted to the right by one place each time a key is depressed. The numbers from "0" to "9", the decimal point ".", the operation instructions "+", "−", "X" and "+" and the variable are encoded as shown in FIG. 4.

Upon degradation of the key PSTK, the flip-flop PF1 is reset so that AND gates PAG1 and PAG2 are disabled. Thus the entry of the program is completed. At this stage the contents of the program register PR are as shown in FIG. 3. With increase in capacity of the program register PR, the number of steps of a program may be increased. Furthermore the use of an addressing system may save the capacity of the program register PR.

In this illustrative embodiment, only one variable "x" is used so that four-bit words may be used, but when one uses a plurality of variables or much more arithmetic operations, data and instructions must be encoded into words of five or more bits.

Next the execution of the program will be described. Assume that one wants to obtain a value of the variable "x" which yields most approximately a given value of the function f(x), such as "5.7222245", in accordance with equation (1). Then an operator depresses the digit keys NK to enter a number "1.1111111" as the variable into the calculator. Since the key PSTK has been already depressed, the calculator is not in the mode or state for receiving the program steps. Therefore the control unit CU causes AND gate AG1 to be enabled so that the above numeric data "1.1111111" is transferred through AND gate AG1 and OR gate OG1 from input unit KI to be stored into the first register R1. Thereafter in response to the control signal from the control unit CU on one input of AND gate AG4 it transfers the contents of the register R1 through the other input of AND gate AG4 to the first display panel DP1 to display the data thereon as shown at (a) in FIG. 5.

Next the operator depresses the program execution key PEK. Then the contents of the program register PR are transferred through AND gate PAG4 to the central processing unit CPU. In the execution of the program, the division and multiplication are given higher priority than the addition and subtraction. That is, the four arithmetic operations are weighted differently, and the central processing unit CPU discriminates the weights of these operation instructions. The contents of the program register PR is recirculated through the loop including AND gate PAG3.

The central processing unit CPU performs "2x + 3.5" for x = 1.1111111, and transfers the result to the second register R2. The contents of the register R2 in turn is transferred through AND gate AG5 to the second display panel DP2 to be displayed as shown at (b) in FIG. 5.

The above process will be described in more detail hereinafter. The contents of the program register PR is shifted to the right and number "2" is stored in a memory location CR1 in the processing unit CPU. Then operator "X" is stored in the central processing unit CPU. When the variable "x" is entered into the central processing unit CPU, the contents of the memory location CR1 is transferred to the memory location CR2 and the contents of the first register R1 is transferred and stored into the memory location CR1.

When operator "+" is transferred or called to the central processing unit CPU, an operation arrangement OP executes the operation of

"2X 1.1111111"

and stores the result into the memory locations CR3 and CR1. The addition instruction "+" is preset into the central processing unit CPU. When "3.5" is transferred in the central processing unit CPU, the contents of the memory location CR1 is transferred to the memory location CR2 and the data "3.5" is stored in the memory location CR1. When the instruction "=" is transferred or called to the central processing unit CPU, the addition of the contents of the memory location CR1 to the contents of the memory location CR2 is executed in accordance with the addition instruction preset in the central processing unit CPU. The result or sum is stored in the memory location CR3 and then is transferred to the second register R2. The contents of the second register R2 will be displayed on the second display panel DP2 as shown at (b) in FIG. 5.

Then the user can acknowledge that the variable x = 1.1111122 would yield a value closer to "5.7222245". Therefore the user adds "0.00000011" to "1.1111111". That is, he depresses the key S1 so as to set the first flip-flop F1, thereby recalling the number indicated in the display panel DP1 or the contents of first register R1. Next the user depresses the key "+" so that the associated coded signal is stored into the instruction register IR and the timing signal generator TU generates the binary "1" signal for a period of time required for the transfer of the contents of the register R1 to the third register R3. Thereafter he depresses the digit keys NK to enter a number "0.0000011", which in turn is stored in the first register R1 to be displayed as shown at (c) in FIG. 5.

Next the user depresses the equal key EK. Then the adder-subtractor AD adds the contents of the first register R1 to the contents of the third register R3 and stores the result or sum into the first register R1. Thus the result is displayed as shown at (d) or (e) in FIG. 5.

Thereafter the user operates the program execution key PEK again. Then the program is executed for the new variable "x" or "1.1111122" in a manner substantially similar to that described above. The result is transferred to the second register R2 and is displayed on the second display panel DP2 as shown at (f) in FIG. 5.

So far the present invention has been described in detail in conjunction with the function $F(x)=2x+3.5$, but it is to be understood that the present invention may be equally applied to other operations such as for converting the yard-pound system into the metric system and vice versa, for obtaining a standard deviation. Moreover, instead of both the adder-subtractor AD and the operation unit OP in the central processing unit CPU, only either of them may be used.

In summary, in the calculator according to the present invention a variable may be increased or decreased and a problem may be solved with respect to the increased or decreased variable in accordance with the program stored. Furthermore both the variable and the result may be displayed in parallel.

What we claim is:

1. An electronic calculator comprising:
   keyboard means having numeric keys for entering numerical information and instruction keys for entering instruction information;
   program memory means connected to said keyboard means for storing instruction information;
   second memory means connected to said keyboard means for storing a value in the form of numerical information;
   first display means connected to said second memory means for displaying said value;
   first processing means connected to said second memory means and said program memory means for processing said value in accordance with the instruction information stored in said program memory means to obtain a result;
   third memory means connected to said first processing means for storing said result;
   second display means connected to said third memory means for displaying said result; and
   second processing means connected to said second memory means, said third memory means and said keyboard means for selectably processing either said result or said value in accordance with instruction information entered by way of said keyboard to obtain either a modified result or a modified value and for storing said modified result or said modified value, as the case may be, in said second memory means.

2. An electronic calculator according to claim 1 further comprising first select means connecting both said keyboard means and said second processing means to said second memory means for selecting, in accordance with instruction information entered by way of said keyboard, between numerical information entered by way of said keyboard and the modified result or the modified value, as the case may be, for entry into said second memory means.

3. An electronic calculator according to claim 2, wherein said second processing means comprises:
   fourth memory means for storing numerical information;
   second select means connected to said keyboard means and also connecting both said second and said third memory means to said fourth memory means for selecting according to instruction information entered by way of said keyboard either said result or said value for storage in said fourth memory means; and
   arithmetic operation means connected to said keyboard means and connecting said second and said fourth memory means to said first select means for performing an arithmetic operation on either said result or said value, as the case may be, and numerical information entered into said second memory means to obtain a modified result or a modified value, as the case may be.

4. A calculator comprising:
   keyboard means having a plurality of numeric keys for entering numerical information, a plurality of instruction keys for entering arithmetic instructions, a first execution key for instructing the execution of each of said arithmetic instructions entered by said plurality of instruction keys and a second execution key for instructing the execution of a plurality of previously entered arithmetic instructions comprising a program,
   program memory means connected to said keyboard means for storing the program,
   numeric memory means, connected to said keyboard means, including a first register for storing said numerical information entered by said numeric keys and a second register,
   processing means coupled to said first register and said second register for performing an arithmetic operation on the numeric information stored in said first register,
   arithmetic operation control means, connected to said keyboard means and to said processing means, responsive to the operation of said first execution key for controlling said processing means to perform arithmetic operations on said numerical information stored in said first register in accordance with each of the plurality of instructions entered by said plurality of instruction keys, and for storing the result from said processing means in said first register, and responsive to the operation of said second execution key for controlling said processing means to perform arithmetic operations on said numerical information stored in said first register in accordance with the program stored in said program memory, and for storing the result from said processing in said second register, and
   display means connected to said numeric memory means for displaying the numerical information stored in said first and said second register.

5. A calculator according to claim 4 further comprising program control means connected to said keyboard means and said program memory for causing said program memory to store the program, which may comprise the sequence of key operations of said numeric keys and said plurality of instruction keys.

* * * * *

UNITED STATES PATENT AND TRADEMARK OFFICE
CERTIFICATE OF CORRECTION

PATENT NO. : 4,352,161

DATED : September 28, 1982

INVENTOR(S) : REIJI HIRANO, ET AL.

It is certified that error appears in the above-identified patent and that said Letters Patent is hereby corrected as shown below:

Column 3

Line 33, change " ".", "" and" to --".", "5" and--.

Line 41, change "degradation" to --depression--.

Signed and Sealed this

First Day of March 1983

[SEAL]

Attest:

GERALD J. MOSSINGHOFF

Attesting Officer     Commissioner of Patents and Trademarks